US011998932B2

(12) United States Patent
Yu et al.

(10) Patent No.: US 11,998,932 B2
(45) Date of Patent: Jun. 4, 2024

(54) HAND SHOWER WITH AUTOMATICALLY RETURNABLE SIDE SWITCH HANDLE AND SHOWER DEVICE

(71) Applicant: SINYU TECHNOLOGY (FUJIAN) CO., LTD., Fujian (CN)

(72) Inventors: Zhangjun Yu, Zhangzhou (CN); Zhicheng Lin, Zhangzhou (CN); Qianzhen Fang, Zhangzhou (CN)

(73) Assignee: SINYU TECHNOLOGY (FUJIAN) CO., LTD. (CN)

( * ) Notice: Subject to any disclaimer, the term of this patent is extended or adjusted under 35 U.S.C. 154(b) by 486 days.

(21) Appl. No.: 17/419,677

(22) PCT Filed: Nov. 2, 2020

(86) PCT No.: PCT/CN2020/125802
§ 371 (c)(1),
(2) Date: Jun. 29, 2021

(87) PCT Pub. No.: WO2022/062074
PCT Pub. Date: Mar. 31, 2022

(65) Prior Publication Data

US 2022/0176389 A1 Jun. 9, 2022

(30) Foreign Application Priority Data

Sep. 24, 2020 (CN) ........................ 202022124097.0

(51) Int. Cl.
*B05B 1/18* (2006.01)

(52) U.S. Cl.
CPC .................................... *B05B 1/18* (2013.01)

(58) Field of Classification Search
CPC ....... B05B 1/12; B05B 1/1627; B05B 1/1636; B05B 1/169; B05B 1/18; B05B 1/185; B05B 12/002; B05B 12/0022; B05B 15/63
See application file for complete search history.

(56) References Cited

U.S. PATENT DOCUMENTS 10,173,235 B2 * 1/2019 Lin ...................... B05B 1/1627
10,179,337 B2 1/2019 Lin
(Continued)

FOREIGN PATENT DOCUMENTS

CN 104056738 A 9/2014
CN 105478251 A 4/2016
(Continued)

OTHER PUBLICATIONS

English language translation of CN-107159476-A, published: Sep. 15, 2017 (Year: 2017).*
English language translation of CN-109701767-A, published: May 3, 2019 (Year: 2019).*
(Continued)

*Primary Examiner* — Darren W Gorman
(74) *Attorney, Agent, or Firm* — BKRIP LLC

(57) ABSTRACT

Provided is a hand shower with an automatically returnable side switch handle, hand shower including a hand shower body, a limiting portion, and a switching mechanism. A rotary disc and a water distribution component are configured inside the hand shower body, a notch is formed in a side surface thereof hand shower, and the limiting portion is fixed therein hand shower. The switching mechanism includes a toggle button, a transmission component, and an elastic reset member. The toggle button is movably provided in the notch and is linked with the transmission component, which is driven to move by toggling the toggle button. The transmission component is linked with the rotary disc to drive it to rotate in a forward direction relative to the water distribution component. The elastic reset member is provided in the hand (Continued)

shower body and acts on the transmission component to drive it to drive the toggle button to be reset.

18 Claims, 5 Drawing Sheets

(56) References Cited

U.S. PATENT DOCUMENTS

| | | | | |
|---|---|---|---|---|
| 2008/0237375 | A1 | 10/2008 | Ko | |
| 2018/0051816 | A1* | 2/2018 | Lin | F16K 3/246 |
| 2018/0178225 | A1* | 6/2018 | Butzke | B05B 1/3006 |
| 2018/0280995 | A1 | 10/2018 | Huang | |
| 2019/0344292 | A1* | 11/2019 | Lin | B05B 12/002 |
| 2020/0086332 | A1* | 3/2020 | Huang | B05B 1/1627 |
| 2020/0197962 | A1* | 6/2020 | Hu | B05B 1/30 |

FOREIGN PATENT DOCUMENTS

| | | | | | |
|---|---|---|---|---|---|
| CN | 107159476 | A | * | 9/2017 | B05B 1/1636 |
| CN | 207667847 | | | 7/2018 | |
| CN | 208004169 | | | 10/2018 | |
| CN | 109174479 | A | | 1/2019 | |
| CN | 109701767 | A | * | 5/2019 | B05B 1/18 |
| CN | 109701767 | A | | 5/2019 | |
| CN | 210474348 | | | 5/2020 | |
| EP | 3578268 | A1 | * | 12/2019 | B05B 1/02 |
| JP | 2014195767 | A | | 10/2014 | |

OTHER PUBLICATIONS

PCT Application No. PCT/CN2020/125802, International Search Report dated Jun. 23, 2021, 3 pp.

PCT Application No. PCT/CN2020/125802, Written Opinion dated Jun. 23, 2021, 4 pp.

* cited by examiner

HAND SHOWER WITH AUTOMATICALLY RETURNABLE SIDE SWITCH HANDLE AND SHOWER DEVICE

CROSS-REFERENCE TO RELATED APPLICATIONS

The present disclosure claims priority to Chinese Patent Application No. 2020221240970, filed with the Chinese Patent Office on Sep. 24, 2020, entitled "Hand shower with Automatically Returnable Side Switch Handle", which is incorporated herein by reference in its entirety.

TECHNICAL FIELD

The present disclosure relates to the technical field of bath hand showers and, in particular, to a hand shower with an automatically returnable side switch handle and a shower device.

BACKGROUND ART

A hand shower is a component of a shower device for dispensing water. Prior art hand showers often have multiple different switchable or selectable water dispensing modes. In different water dispensing modes, water flows in different states, and for example, jets of water are sprayed at different densities from different positions at different total flow rates. Generally, the mode switching of a hand shower should be implemented by a switching mechanism movably provided on the hand shower, but the prior art hand showers can hardly be switched with one hand when the hand showers are held in the hand, which leads to inconvenient use of the hand showers with multiple water dispensing modes.

SUMMARY

The object of the present disclosure includes providing a hand shower with an automatically returnable side switch handle and a shower device, which can solve the problem of inconvenient use of the prior art hand showers caused because they can hardly be operated to be switched with one hand.

An embodiment of the present disclosure provides a hand shower with an automatically returnable side switch handle, including:

- a hand shower body, in which a rotary disc and a water distribution component are provided, a notch being formed in a side surface of the hand shower body;
- a limiting portion, fixed in the hand shower body; and
- a switching mechanism, including a toggle button, a transmission component, and an elastic reset member,
- wherein the toggle button is movably provided in the notch and is linked with the transmission component, and the transmission component is driven to move by toggling the toggle button;
- the transmission component is linked with the rotary disc to drive the rotary disc to rotate in a forward direction relative to the water distribution component so as to switch a water flow;
- the elastic reset member is provided in the hand shower body and acts on the transmission component to drive the transmission component to drive the toggle button to be reset; and
- wherein the limiting portion acts on the rotary disc to prevent a rotation of the rotary disc in a reverse direction.

When using the hand shower with an automatically returnable side switch handle according to the embodiment of the present disclosure, the user can hold the hand grip of the hand shower body with one hand, and touch the side surface of the hand shower body and toggle the toggle button with a finger to drive the transmission component to drive the rotary disc to rotate relative to the water distribution component, thereby completing a switching of a water dispensing mode (switching of the water flow state). Then, when the force of the finger acting on the toggle button is released, the toggle button is reset under the action of the elastic reset member so as to be ready for the next toggling. At the same time, while the toggle button is being reset, the limiting portion prevents a rotation of the rotary disc in a reverse direction so that the rotary disc is maintained in the current state, namely, the current water flow is maintained.

In an optional embodiment, the water distribution component includes a water distribution tray and a rear cover connected to each other, and a plurality of first water passage holes are formed in the water distribution tray;

- the rotary disc includes a switching plate and a rotating portion connected to each other;
- the switching plate is located between the water distribution tray and the rear cover, second water passage holes are formed in the switching plate to match the first water passage holes, and the rotating portion passes through the rear cover and is connected to the transmission component; and
- the transmission component, the elastic reset member, and the limiting portion are provided on a surface of the rear cover.

In the embodiment of the present disclosure, each time the toggle button is toggled, the rotary disc can be rotated so that the first water passage holes are matched with different second water passage holes to achieve the switching of different water flows. Furthermore, if the second water passage holes are misaligned with the first water passage holes, water passages are closed, and no water is dispensed from the hand shower (i.e., the hand shower with an automatically returnable side switch handle; the term "hand shower" appearing alone hereinafter is short for the hand shower with an automatically returnable side switch handle according to the embodiment of the present disclosure, which will not be repeated hereafter). Both the switching mechanism and the limiting portion are provided on the surface of the rear cover, which facilitates maintenance and replacement of parts to effectively reduce the maintenance cost. Moreover, because the switching mechanism, the limiting portion, and the rotary disc are all provided on the water distribution component, the hand shower has a compact structure and exhibits high connection stability, which facilitates an increase in the service life of the hand shower.

In an optional embodiment, the transmission component includes a transmission member, a driving member, and a driving pawl;

- the transmission member is linked with the toggle button, the transmission member has a toothed structure, the driving member has driving teeth, and the driving teeth of the driving member mesh with the toothed structure of the transmission member;
- the driving pawl is provided on a surface of the driving member and is configured to move along with the driving member;
- the rotating portion includes a rotating shaft and a driving ratchet;
- one end of the rotating shaft is connected to the switching plate; and the driving ratchet is provided at an end of the rotating shaft away from the switching plate and is in transmission connection to the driving pawl.

In the embodiment of the present disclosure, the toggle button is toggled so that the transmission member drives the driving member to move, whereby the driving pawl drives the driving ratchet to rotate in the forward direction. The rotational angle of the rotary disc is advantageously accurately controlled by driving the rotation of the rotary disc by means of gear transmission. Moreover, the compact structure of the transmission component contributes to the utilization of the internal space of the hand shower body. Further, the driving pawl and the driving ratchet are matched with each other, so that it can be ensured that the transmission component will drive the rotary disc to rotate only in the forward direction and will not drive the rotary disc to rotate in the reverse direction, thereby ensuring a stable water flow from the hand shower.

In an optional embodiment, the driving ratchet and the rotating shaft are fixed by a snap ring to maintain a stable connection.

In an optional embodiment, a clamping groove is provided in the surface of the driving member, and the driving pawl is clamped in the clamping groove.

The driving pawl meshes with the driving ratchet. In an optional embodiment, the surface of the driving member is provided with two clamping grooves spaced apart from each other, two driving pawls are clamped in the two clamping grooves, respectively, and the two driving pawls are both meshed with the driving ratchet.

In the above implementation process, the driving pawls can be easily removed from the driving member for easy maintenance and replacement. Moreover, the two driving pawls act together on the driving ratchet to facilitate the normal rotation of the rotary disc and ensure stable switching of water flow.

In an optional embodiment, the limiting portion includes a limiting pawl, and the limiting pawl is fixed on the surface of the rear cover and abuts against the driving ratchet to prevent a rotation of the driving ratchet in a reverse direction.

In the above implementation process, the limiting portion has a simple structure and a good limiting effect and can effectively prevent a rotation of the driving ratchet in the reverse direction so as to ensure no rotation of the rotary disc after the force acting on the toggle button is released.

In an optional embodiment, the transmission member includes a connecting member and the toothed structure;

the toothed structure is formed at one end of the connecting member, and the other end of the connecting member is connected to the toggle button;

the connecting member is rotatably provided on the rear cover via a fixed shaft, and the connecting member is configured to rotate around the fixed shaft to drive a rotation of the driving member; and the elastic reset member has one end fixed to the rear cover, and the other end connected to the connecting member.

In the above implementation process, the transmission member has an exquisite structure, which can convert the lateral movement of the toggle button into a rotational movement, thereby driving the driving member to rotate. This makes it easy for the user to operate with one hand and facilitates the switching of water flow from the hand shower. Moreover, the elastic reset member acts on the side surface of the connecting member, which facilitates rapid resetting of the transmission member and the toggle button.

In an optional embodiment, a boss is provided on a side surface of the connecting member, and one end of the elastic reset member is sleeved on the boss. The arrangement of the boss facilitates the mounting of the elastic reset member.

In an optional embodiment, a protruding shaft is formed on the surface of the rear cover, the driving member is rotatably sleeved on the protruding shaft, one of the protruding shaft or the driving member is provided with a limiting block, the other one of the protruding shaft or the driving member is provided with a limiting groove, and the limiting block is configured to slide in the limiting groove. In an optional embodiment, the limiting block is provided on an outer side wall of the protruding shaft, and the limiting groove is provided in an inner side wall of the driving member to fit with the limiting block.

In the above implementation process, the driving member can rotate smoothly around the protruding shaft to avoid misalignment when the transmission component is linked with the rotary disc, thereby ensuring the normal switching of water flow. Moreover, the limiting groove and the limiting block in cooperation with each other can limit the rotation stroke of the driving member to avoid unsuccessful or incorrect switching of water flow due to excessive rotation of the driving member.

In an optional embodiment, the notch is located in the side surface of the hand shower body close to a hand grip.

In the above implementation process, the notch is provided in the side surface of the hand shower body close to the handle grip, so that it is more convenient for the user to operate the toggle button at the notch with one hand, thereby completing the switching of the water dispensing mode.

In an optional embodiment, the notch is in the shape of a strip and extends along the peripheral side of the head portion of the hand shower body, and the toggle button is configured to move in a length direction of the notch. As the notch is provided in a strip shape, the toggle button can be slid along the notch, thereby achieving the switching of the water dispensing mode.

In an optional embodiment, a water inlet pipe is provided in the grip portion of the hand shower body, and the water inlet pipe communicates with the water distribution component. As the water inlet pipe is provided in the grip portion, the space in the grip portion is reasonably utilized, and the problem of arrangement of the water inlet pipe is solved.

In an optional embodiment, the toggle button is equipped with a shielding piece, a gap is formed in the shielding piece, and the toggle button is embedded in the gap; and the shielding piece moves along with the toggle button to shield the notch.

In the above implementation process, the shielding piece serves as a shield for the notch to prevent the user from seeing the parts inside the hand shower body from the notch and obtain a beautiful and neat product, and also to prevent entry of foreign objects into the interior of the hand shower body to avoid damage of the parts inside the hand shower body.

In an optional embodiment, the elastic reset member is a spring. The spring acting as an elastic reset member enables the transmission component to be reset stably.

In an optional embodiment, the hand shower body is equipped with self-cleaning silicone dots and a water outlet panel; and the self-cleaning silicone dots are provided between the water outlet panel and the water distribution component.

In the above implementation process, the self-cleaning silicone dots are provided to facilitate the cleaning of the hand shower and avoid blockage of the hand shower caused by limescale.

In an optional embodiment, the hand shower body is provided with a decorative cover to shield the water outlet panel. The decorative cover is provided to give a neat appearance to the hand shower with an automatically returnable side switch handle, and also to play a role in protecting the water outlet panel.

In an optional embodiment, the hand shower body is provided with a spray plug, and the spray plug communicates with the water distribution component. The comfort of the user in showering can be improved by providing a spray plug.

An embodiment of the present disclosure further provides a shower device, which includes the hand shower with an automatically returnable side switch handle according to any one of the above embodiments.

BRIEF DESCRIPTION OF THE DRAWINGS

In order to more clearly illustrate the technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

Figure 1:
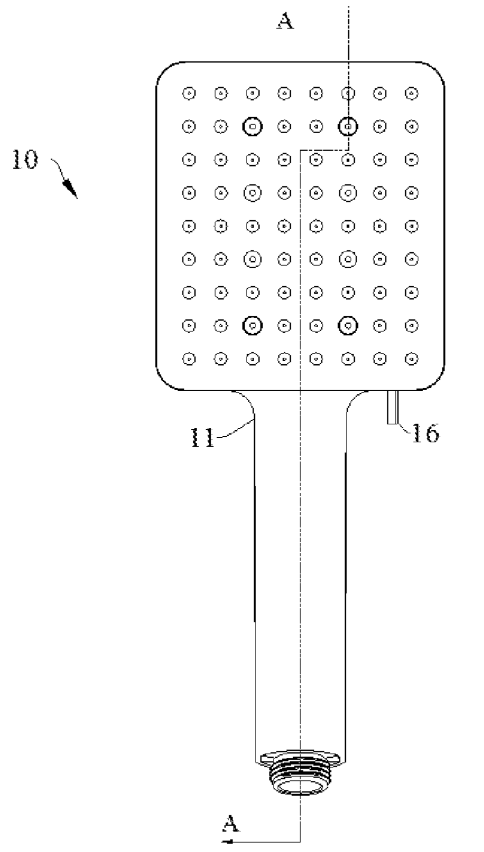
FIG. 1 is a front view of a hand shower with an automatically returnable side switch handle in this embodiment.

Reference Numerals: 10—hand shower with an automatically returnable side switch handle; 11—hand shower body; 12—limiting portion; 13—switching mechanism; 13*a*—rotary disc; 14—water distribution component; 15—notch; 16—toggle button; 17—transmission component; 18—elastic reset member; 19—water inlet pipe; 20—C-shaped snap ring; 21—shielding piece; 22—gap; 23—water distribution tray; 24—rear cover; 25—first water passage hole; 26—switching plate; 27—rotating portion; 28—second water passage hole; 29—snap ring; 30—transmission member; 31—driving member; 32—driving pawl; 33—rotating shaft; 34—driving ratchet; 35—clamping groove; 36—limiting pawl; 37—connecting member; 38—toothed structure; 39—fixed shaft; 40—boss; 41—protruding shaft; 42—limiting block; 43—limiting groove; 44—self-cleaning silicone dot; 45—water outlet panel; 46—screw; 47—decorative cover; 48—spray plug; 49—E-shaped snap ring.

DETAILED DESCRIPTION OF THE EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

It should be noted that similar reference numerals and letters refer to similar items in the following figures, and thus once an item is defined in one figure, it may not be further defined or explained in the following figures.

In the description of the embodiments of the present disclosure, it should be understood that the terms such as "center", "up", "down", "left", "right", "vertical", "horizontal", "inside", and "outside" indicate the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure.

In the description of the embodiments of the present disclosure, it should also be noted that terms "arrange", "mount", "couple", and "connect" should be understood broadly unless otherwise expressly specified or defined. For example, connection may be fixed connection or detachable connection or integral connection, or may be direct coupling or indirect coupling via an intermediate medium or internal communication between two elements. The specific meanings of the above-mentioned terms in the present disclosure can be understood by those of ordinary skill in the art according to specific situations.

It should be noted that the embodiments in the present disclosure and the features in the embodiments may be combined with each other if there is no conflict.

The technical solutions in the present disclosure will be described below with reference to the accompanying drawings.

In the related art, a mechanism for switching a water dispensing mode of a hand shower is generally provided on the front side of the panel of the hand shower, and must be operated distally to switch back to the original mode after the mode is switched. For a hand shower with multiple water dispensing modes, the switching mechanism has a long stroke. When the switching mechanism is located away from the grip portion of the hand shower, it is difficult to operate the switching mechanism with one hand, resulting in inconvenient use of the multifunctional hand shower.

Therefore, an embodiment of the present disclosure provides a hand shower 10 with an automatically returnable side switch handle to ameliorate the problem of inconvenient use of the hand showers in the related art caused by the difficulty in switching the water dispensing mode with one hand.

Figure 2:
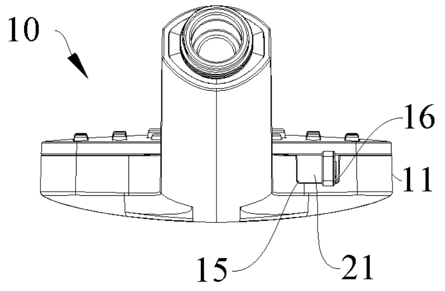
FIG. 2 is a side view of the hand shower with an automatically returnable side switch handle in this embodiment.
Figure 3:
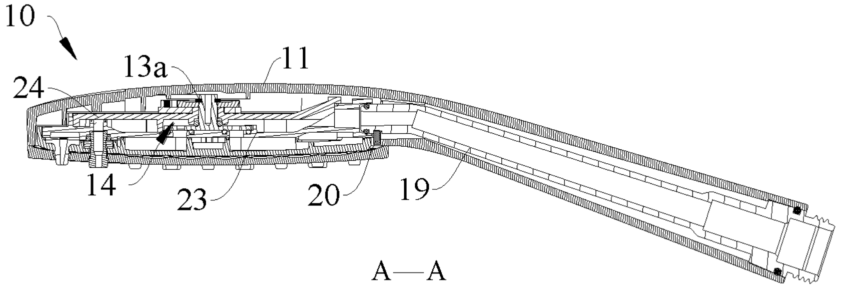
FIG. 3 is a sectional view taken along a direction A-A in FIG. 1.
Figure 4:
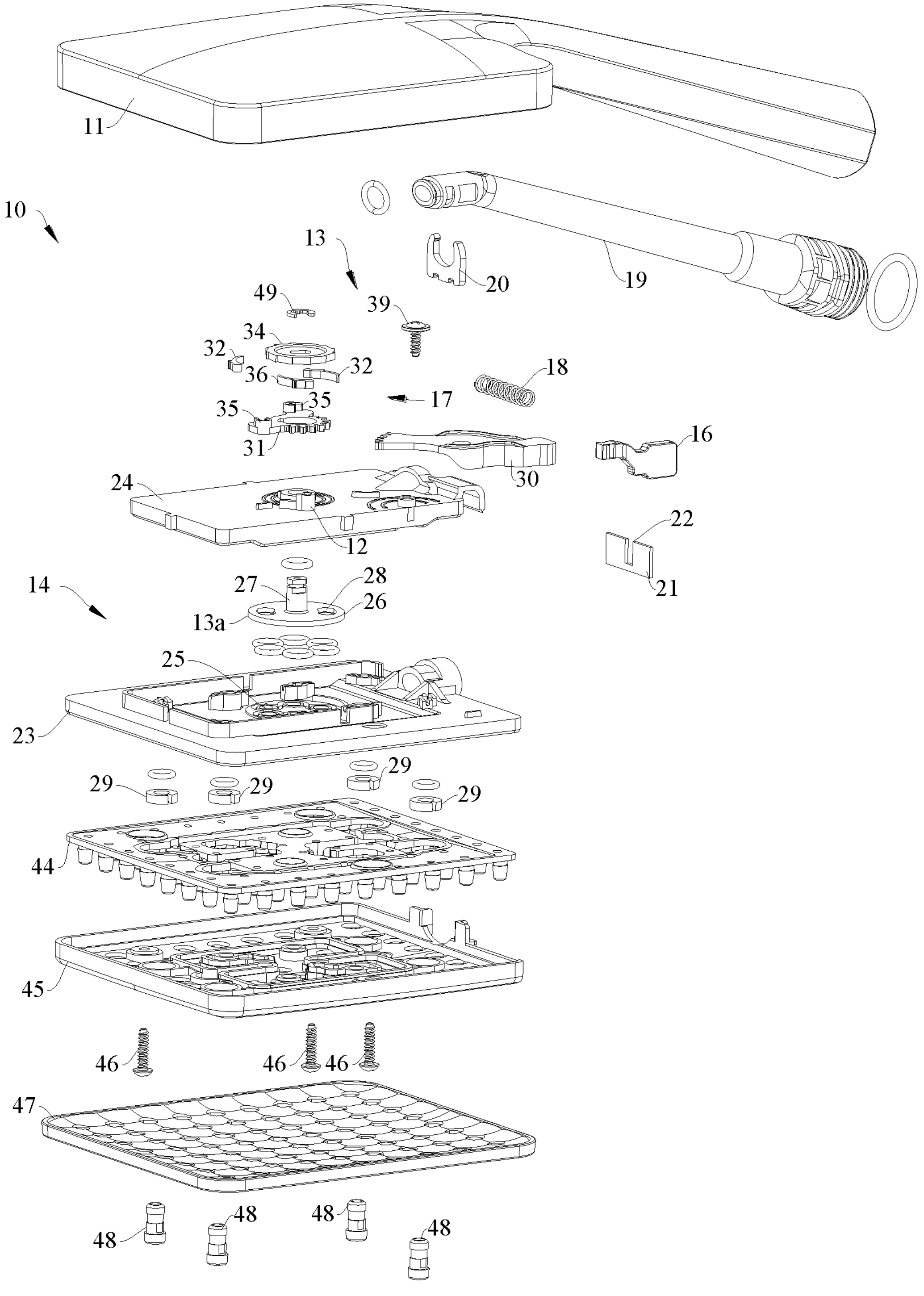
FIG. 4 is a perspective exploded view of the hand shower with an automatically returnable side switch handle in this embodiment.

Referring to FIGS. 1 to 4, FIG. 1 is a front view of the hand shower 10 with an automatically returnable side switch handle in this embodiment, FIG. 2 is a side view of the hand shower 10 with an automatically returnable side switch handle in this embodiment, FIG. 3 is a sectional view taken along a direction A-A in FIG. 1, and FIG. 4 is a perspective exploded view of the hand shower 10 with an automatically returnable side switch handle in this embodiment.

In the embodiment of the present disclosure, the hand shower 10 with an automatically returnable side switch handle includes a hand shower body 11, a limiting portion 12, and a switching mechanism 13.

The hand shower body 11 includes a head portion and a grip portion connected to the head portion. Water flows from the grip portion of the hand shower body 11 and is sprayed out from the head portion of the hand shower body 11. The grip portion of the hand shower body 11 is intended to be held by the user. The switching mechanism 13 is provided at the head portion of the hand shower body 11. A rotary disc 13*a* and a water distribution component 14 are configured inside the hand shower body 11. A notch 15 is formed in a side surface of the hand shower body 11. In the embodiment of the present disclosure, the notch 15 is formed in the head portion of the hand shower body 11 and has an opening extending along the outer peripheral side of the head portion of the hand shower body 11. The limiting portion 12 is fixed in the hand shower body 11. Optionally, the limiting portion 12 is located in the head portion of the hand shower body 11. In this embodiment, the head portion of the hand shower body 11 is a rectangular body, the side surface for dispensing water is a rectangular surface, and the grip portion of the hand shower body 11 is in the shape of a cylinder or a cone. It should be understood that, in other optional embodiments, the shape of the head portion of the hand shower body 11 may be adjusted to, for example, a disc shape, and the grip portion of the hand shower body 11 may have a polygonal cross-sectional shape.

The switching mechanism 13 includes a toggle button 16, a transmission component 17, and an elastic reset member 18.

The toggle button 16 is movably provided in the notch 15, the toggle button 16 is linked with the transmission component 17, and the transmission component 17 can be driven to move by toggling the toggle button 16. The transmission component 17 is linked with the rotary disc 13*a* to drive the rotary disc 13*a* to rotate in a forward direction relative to the water distribution component 14 to switch the water flow. The toggle button 16 has one part located in the hand shower body 11 and in transmission connection to the transmission component 17, and the other part extending to the outside of the hand shower body 11 through the notch 15 so as to be toggled by the user with a hand (finger). Here, the switching of the water flow refers to switching of a water dispensing mode of the hand shower 10 with an automatically returnable side switch handle to change the water dispensing state.

The elastic reset member 18 is provided in the hand shower body 11 and acts on the transmission component 17 to drive the transmission component 17 to drive the toggle button 16 to be reset.

Here, the limiting portion 12 acts on the rotary disc 13*a* to prevent a rotation of the rotary disc 13*a* in a reverse direction.

When using the hand shower 10 with an automatically returnable side switch handle according to the embodiment of the present disclosure, the user can hold the grip portion of the hand shower body 11 with one hand, and touch the side surface of the hand shower body 11 (e.g., the side surface of the head portion of the hand shower body 11) and toggle the toggle button 16 with a finger to drive the transmission component 17 to drive the rotary disc 13*a* to rotate relative to the water distribution component 14, thereby completing a switching of water flow (switching of a water dispensing mode). Then, when the force of the finger acting on the toggle button 16 is released, the toggle button 16 is reset under the action of the elastic reset member 18 so as to be ready for the next toggling. At the same time, while the toggle button 16 is being reset, the limiting portion 12 prevents a rotation of the rotary disc 13*a* in a reverse direction so that the rotary disc 13*a* is maintained in the current state, namely, the current water dispensing mode is maintained. Since the toggle button 16 will be reset every time it is toggled, the problem is avoided that it is difficult to perform the next switching operation with one hand after the toggle button 16 is toggled to a position far away from the grip portion.

It should be noted that, referring to FIGS. 3 and 4, a water inlet pipe 19 is fixed inside the grip portion of the hand shower body 11 by means of a C-shaped snap ring 20. The water inlet pipe 19 communicates with the water distribution component 14 to supply water to the water distribution component 14. The water inlet pipe 19 is connected to the water distribution component 11 at its end close to the head portion of the hand shower body 11, and provided with an external thread at its end far away from the head portion of the hand shower body 11 so as to be connect to an external water pipe. Moreover, the two end portions of the water inlet pipe 19 are provided with sealing rings, respectively, to ensure a good sealing effect between the water inlet pipe 19 and each of the water distribution component 14 and the external water pipe, to avoid water leakage.

Figure 5:
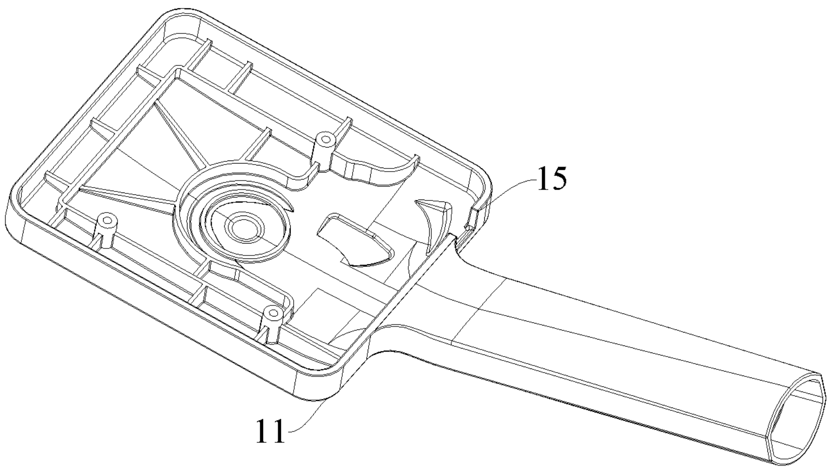
FIG. 5 is a schematic view of a hand shower body in this embodiment.
Figure 6:
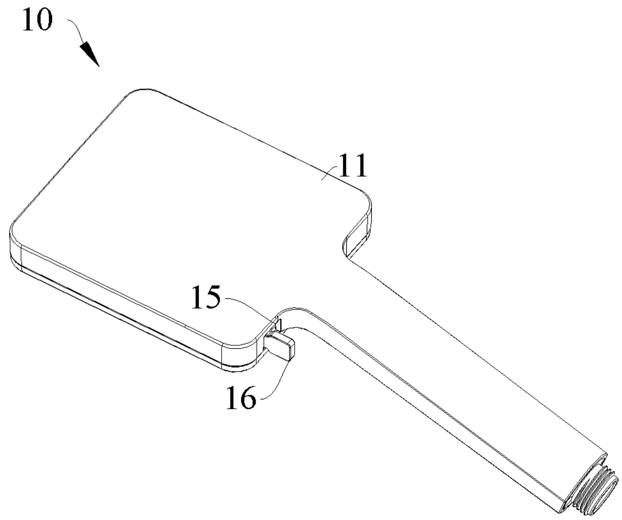
FIG. 6 is a rear view of the hand shower with an automatically returnable side switch handle when a toggle button is not toggled in this embodiment.
Figure 7:
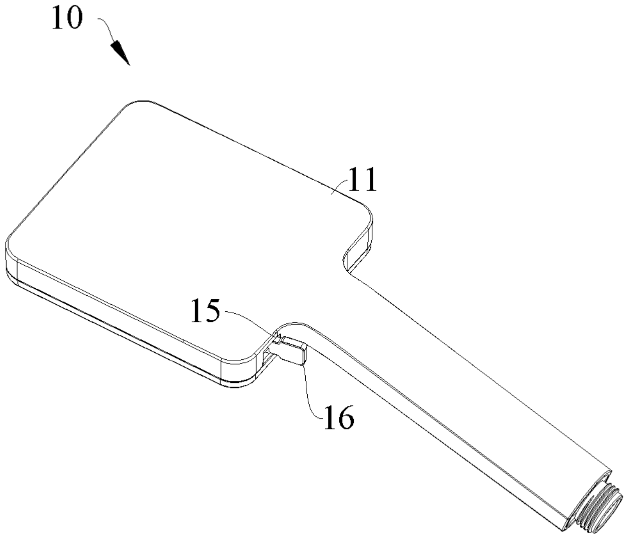
FIG. 7 is a rear view of the hand shower with an automatically returnable side switch handle after the toggle button is toggled in this embodiment.

Referring to FIG. 2 in combination with FIGS. 5, 6, and 7, FIG. 5 is a schematic view of the hand shower body 11 in this embodiment, FIG. 6 is a rear view of the hand shower 10 with an automatically returnable side switch handle when the toggle button 16 is not toggled in this embodiment, and FIG. 7 is a rear view of the hand shower 10 with an automatically returnable side switch handle after the toggle button 16 is toggled.

In the present disclosure, the notch 15 is located in the side surface of the head portion of the hand shower body 11 close to the grip portion. As the notch 15 is provided at a position close to the grip portion of the hand shower body, it is more convenient to operate the toggle button 16 provided at the notch 15 when holding the grip portion with one hand. The user can easily toggle the toggle button 16 to complete the switching of the water dispensing mode.

Figure 8:
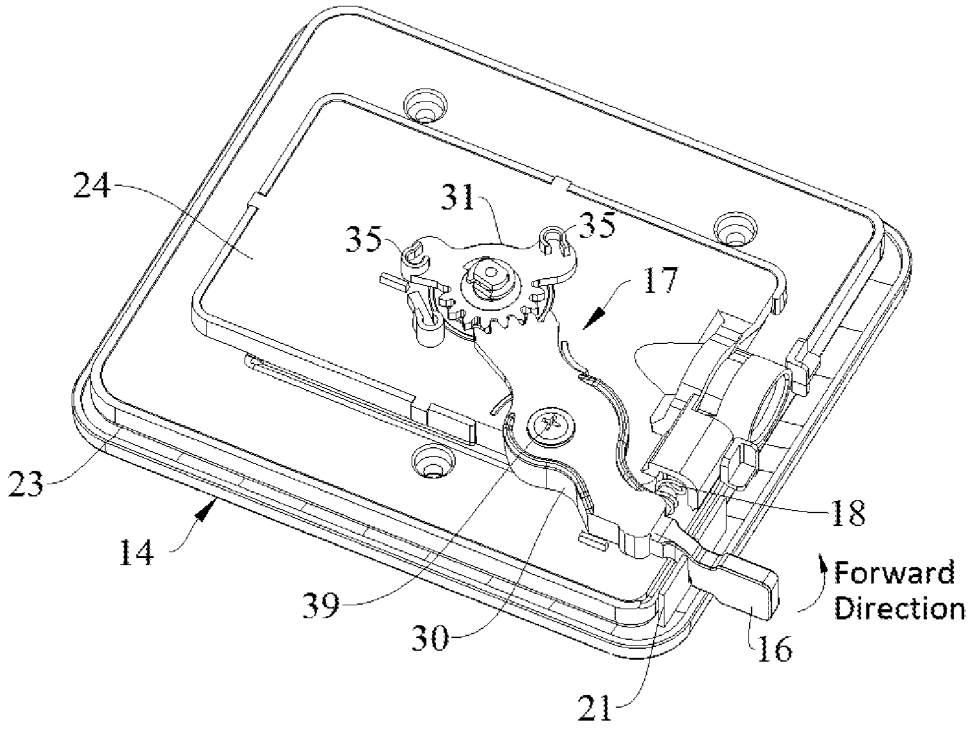
FIG. 8 is a schematic perspective view of a toggle button, a transmission component, and a water distribution component in this embodiment.
Figure 9:
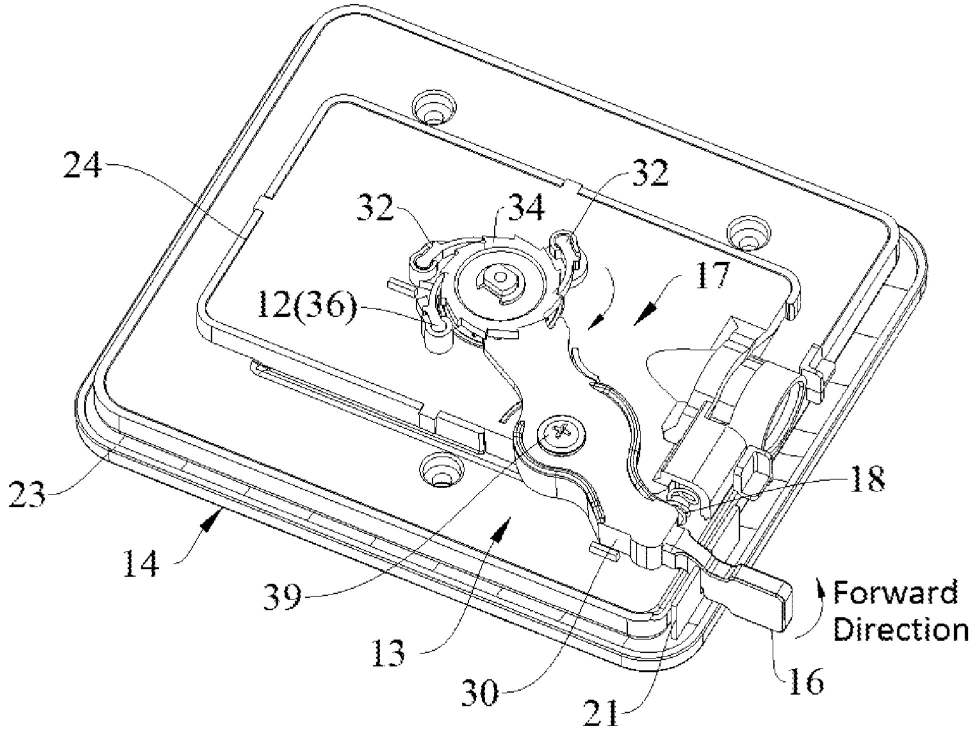
FIG. 9 is a schematic perspective view of a switching mechanism and a water distribution component in this embodiment.
Figure 10:
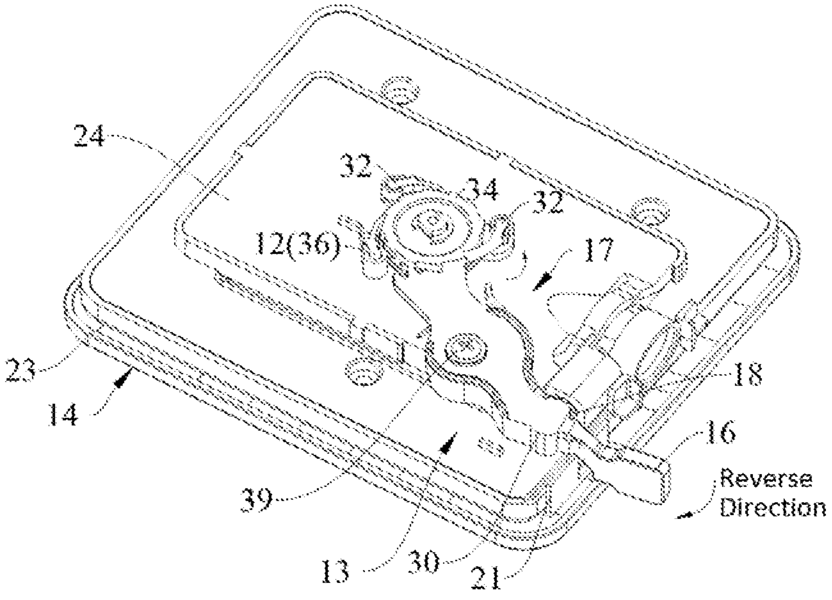
FIG. 10 is a schematic perspective view of the switching mechanism and the water distribution component after the toggle button is toggled in this embodiment.

Referring to FIGS. 8 to 10, FIG. 8 is a schematic perspective view of the toggle button 16, the transmission component 17, and the water distribution component 14 in this embodiment, FIG. 9 is a schematic perspective view of the switching mechanism 13 and the water distribution component 14 in this embodiment, and FIG. 10 is a schematic perspective view of the switching mechanism 13 and the water distribution component 14 after the toggle button 16 is toggled in this embodiment.

In the present disclosure, the toggle button 16 is equipped with a shielding piece 21, a gap 22 is formed in the shielding piece 21 (see FIG. 4), and the toggle button 16 is embedded in the gap 22 so as to be kept fixed to the shielding piece 21. The shielding piece 21 moves along with the toggle button 16 to shield the notch 15. In this embodiment, the shielding piece 21 and the toggle button 16 are structurally separated from each other. In other optional embodiments, the shielding piece 21 and the toggle button 16 may be formed integrally. The shielding piece 21 is a rectangular plate body larger than the notch 15 in this embodiment. In other optional embodiments, the shielding piece 21 may be of other shapes, such as an elliptical shape.

In the embodiment of the present disclosure, the shielding piece 21 serves as a shield for the notch 15 to prevent the user from seeing the parts inside the hand shower body 11 from the notch 15 and obtain a beautiful and neat product, and also to prevent entry of foreign objects into the interior of the hand shower body 11 to avoid damage of the parts inside the hand shower body 11. It can be seen from FIGS. 9 and 10 that the shielding piece 21 moves with the toggle button 16, and the shielding piece 21 should be sized to be able to shield the notch 15 regardless of any position in the notch 15 at which the toggle button 16 is located.

Figure 11:
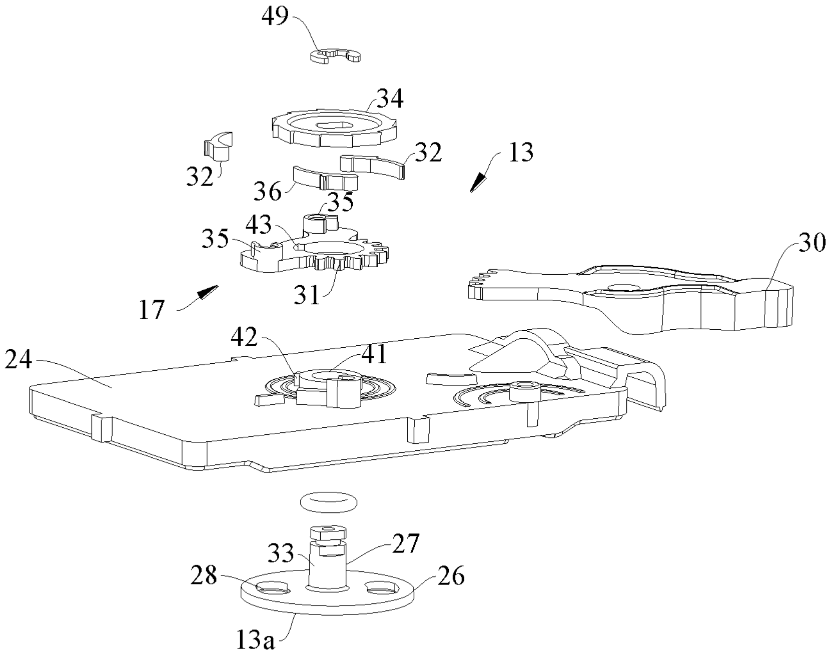
FIG. 11 is a perspective exploded view of the switching mechanism and the rear cover in this embodiment.
Figure 12:
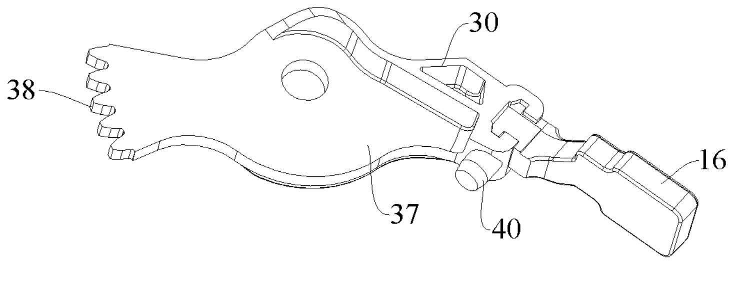
FIG. 12 is a perspective view of the transmission member and the toggle button in this embodiment.

Referring to FIG. 4 in combination with FIG. 11, FIG. 11 is a perspective exploded view of the switching mechanism 13 and the rear cover 24 in this embodiment.

In the present disclosure, the water distribution component 14 includes a water distribution tray (or disc) 23 and a rear cover 24 connected to each other, and a plurality of first water passage holes 25 are formed in the water distribution tray 23. The rotary disc **13*a* of the switching mechanism 13 includes a switching plate 26 and a rotating portion 27** connected to each other.

The switching plate 26 is located between the water distribution tray 23 and the rear cover 24. Second water passage holes 28 are formed in the switching plate 26 to match the first water passage holes 25. The rotating portion 27 passes through the rear cover 24 and is connected to the transmission component 17. The transmission component 17, the elastic reset member, and the limiting portion 12 are provided on the surface of the rear cover 24. It should be understood that a plurality of second water passage holes 28 are provided in the switching plate 26, and different water flow states are created when different second water passage holes 28 are matched with the first water passage holes 25.

In the embodiment of the present disclosure, each time the toggle button 16 is toggled, the rotary disc **13*a* can be rotated so that the first water passage holes 25 are matched with different second water passage holes 28 to achieve the switching of different water flows. Furthermore, if the second water passage holes 28 are misaligned with the first water passage holes 25, water passages are closed, and no water is dispensed from the hand shower (i.e., the hand shower 10 with an automatically returnable side switch handle, where the term "hand shower" appearing alone hereinafter is short for the hand shower 10 with an automatically returnable side switch handle, which will not be repeated hereafter). Both the switching mechanism 13 and the limiting portion 12 are provided on the surface of the rear cover 24, which facilitates maintenance and replacement of parts to effectively reduce the maintenance cost. Moreover, because the switching mechanism 13, the limiting portion 12, and the rotary disc 13*a* are all provided on the water distribution component 14**, the hand shower has a compact structure and exhibits high connection stability, which facilitates an increase in the service life of the hand shower.

It should be noted that the water distribution tray 23 and the rear cover 24 are provided with a snap ring 29 as a fixing structure to improve the stability of connection between the water distribution tray 23 and the rear cover 24, and a sealing ring is also provided to improve the sealing effect.

It should be noted that a sealing ring is also provided between the water distribution tray 23 and the rotary disc **13*a*** in order to improve the sealing effect.

With reference to FIGS. 8 to 12, FIG. 12 is a perspective view of the transmission member 30 and the toggle button 16 in this embodiment.

In the present disclosure, the transmission component 17 includes a transmission member 30, a driving member 31, and a driving pawl 32.

As shown in the figure, the transmission member 30 is linked with the toggle button 16, the transmission member 30 has a toothed structure 38, the driving member 31 has driving teeth, and the driving teeth of the driving member 31 mesh with the toothed structure 38 of the transmission member 30. The driving pawl 32 is provided on the surface of the driving member 31 and is configured to move along with the driving member 31. The rotating portion 27 includes a rotating shaft 33 and a driving ratchet 34. One end of the rotating shaft 33 is connected to the switching plate 26. The driving ratchet 34 is provided on an end surface of an end of the rotating shaft 33 away from the switching plate 26, and is located above the driving member 31 and in transmission connection to the driving pawl 32. Optionally, the driving ratchet 34 and the rotating shaft 33 are fixed by an E-shaped snap ring 49.

In this embodiment, the toggle button 16 is toggled so that the transmission member 30 drives the driving member 31 to move, whereby the driving pawl 32 drives the driving ratchet 34 to rotate in the forward direction. The rotational angle of the rotary disc **13*a* is advantageously accurately controlled by driving the rotation of the rotary disc 13*a* by means of gear transmission. Moreover, the compact structure of the transmission component 17 contributes to the utilization of the internal space of the hand shower body 11. Further, the driving pawl 32 and the driving ratchet 34 are matched with each other, so that it can be ensured that the transmission component 17 will drive the rotary disc 13*a* to rotate only in the forward direction and will not drive the rotary disc 13*a*** to rotate in the reverse direction, thereby ensuring a stable water flow from the hand shower.

Optionally, in the present disclosure, the surface of the driving member 31 is provided with a clamping groove 35, and the driving pawl 32 is clamped in the clamping groove 35 and meshes with the driving ratchet 34. Optionally, there are two clamping grooves 35. Driving pawls 32 are clamped in the two clamping grooves 35, respectively, and the two driving pawls 32 are both meshed with the driving ratchet 34.

In the above implementation process, the driving pawls 32 can be easily removed from the driving member 31 for easy maintenance and replacement. Moreover, the two driving pawls 32 act together on the driving ratchet 34 to facilitate the normal rotation of the rotary disc 13*a* and ensure stable switching of water flow. In other optional embodiments, the surface of the driving member 31 may not be provided with a clamping groove 35, and the driving pawl 32 may be fixedly connected to the driving member 31 by other means. For example, the driving pawl 32 may be formed integrally with the driving member 31.

In the present disclosure, optionally, the limiting portion 12 includes a limiting pawl 36 fixed on the surface of the rear cover 24 and abutting against the driving ratchet 34 to prevent a rotation of the driving ratchet 34 in the reverse direction.

In the above implementation process, the limiting portion 12 has a simple structure and a good limiting effect and can effectively prevent a rotation of the driving ratchet 34 in the reverse direction so as to ensure no rotation of the rotary disc 13*a* after the force acting on the toggle button 16 is released.

In the present disclosure, the transmission member 30 includes a connecting member 37 and a toothed structure 38. The toothed structure 38 is formed at one end of the connecting member 37, and the other end of the connecting member 37 is connected to the toggle button 16. The connecting member 37 is rotatably provided on the rear cover 24 via a fixed shaft 39, and the toggle button 16 is toggled so that the connecting member 37 rotates around the fixed shaft 39 so as to drive a rotation of the driving member 31. The elastic reset member 18 has one end fixed to the rear cover 24, and the other end connected to the connecting member 37. Optionally, a boss 40 is formed on a side surface of the connecting member 37, and the elastic reset member 18 has one end fixed to the rear cover 24 and the other end sleeved on the boss 40. In this embodiment, the elastic reset member 18 is a spring. In other optional embodiments, the elastic reset member 18 may be an elastic member such as a rubber band.

In the embodiment of the present disclosure, the transmission member 30 has an exquisite structure, which can convert the lateral movement of the toggle button 16 into a rotational movement, thereby driving the driving member 31 to rotate. This makes it easy for the user to operate with one hand and facilitates the switching of water flow from the hand shower. Moreover, the elastic reset member 18 acts on the side surface of the connecting member 37, which facilitates rapid resetting of the transmission member 30 and the toggle button 16.

Optionally, a protruding shaft 41 is formed on the surface of the rear cover 24, and the driving member 31 is rotatably sleeved on the protruding shaft 41. The driving member 31 is rotatably sleeved on the protruding shaft 41, one of the protruding shaft 41 or the driving member 31 is provided with a limiting block 42, the other one of the protruding shaft or the driving member is provided with a limiting groove 43, and the limiting block 42 is configured to slide in the limiting groove 43. As shown in FIG. 11, optionally, the limiting block 42 is provided on the outer side wall of the protruding shaft 41, and the limiting groove 43 is provided in the inner side wall of the driving member 31 to fit with the limiting block 42. In this embodiment, the size of the limiting groove 43 is larger than the size of the limiting block 42, so that the rotation of the driving member 31 relative to the protruding shaft 41 is limited to a certain extent.

In the above implementation process, the driving member 31 can rotate smoothly around the protruding shaft 41 to avoid misalignment when the transmission component 17 is linked with the rotary disc 13*a*, thereby ensuring the normal switching of water flow. Moreover, the limiting groove 43 and the limiting block 42 in cooperation with each other can limit the rotation stroke of the driving member 31 to avoid unsuccessful or incorrect switching of water flow due to excessive rotation of the driving member 31.

Referring again to FIG. 4, in the embodiment of the present disclosure, the hand shower body 11 is equipped with self-cleaning silicone dots 44 and a water outlet panel 45, and the self-cleaning silicone dots 44 are provided between the water outlet panel 45 and the water distributing component 14.

The self-cleaning silicone dots 44 are provided to facilitate the cleaning of the hand shower and avoid blockage of the hand shower caused by limescale.

Optionally, the water outlet panel 45 is fixed to the water distribution tray 23 by screws 46. It should be understood that, in other optional embodiments, the water outlet panel 45 may be detachably connected to the water distribution tray 23 by means of a snap-fit structure.

Optionally, in the present disclosure, the hand shower body 11 is further equipped with a decorative cover 47 to shield the water outlet panel 45 so as to give a neat appearance to the hand shower 10 with an automatically returnable side switch handle and also to play a role in protecting the water outlet panel 45. Optionally, the hand shower body 11 is further equipped with a spray plug 48 which communicates with the water distribution component 14, in order to improve the comfort of the user in showering.

In use of the hand shower according to the embodiment of the present disclosure, when the grip portion of the hand shower body 11 is held with one hand, it is also convenient to toggle the toggle button 16 with the same hand to switch the water dispensing mode. Each time switching is performed, the toggle button 16 can be restored to the original position to facilitate the next switching operation. The water dispensing mode can be switched periodically by repeatedly toggling the toggle button 16.

An embodiment of the present disclosure further provides a shower device, which includes a hand shower 10 with an automatically returnable side switch handle according to an embodiment of the present disclosure. Optionally, the shower device may further include other components such as a water inlet pipe and a bracket for supporting the hand shower.

In summary, a hand shower with an automatically returnable side switch handle according to an embodiment of the present disclosure includes a hand shower body, a limiting portion, and a switching mechanism. A rotary disc and a water distribution component are configured inside the hand shower body, and a notch is formed in a side surface of the hand shower body. The limiting portion is fixed in the hand shower body. The switching mechanism includes a toggle button, a transmission component, and an elastic reset member. The toggle button is movably provided in the notch and is linked with the transmission component, and the transmission component is driven to move by toggling the toggle button. The transmission component is linked with the rotary disc to drive the rotary disc to rotate in a forward direction relative to the water distribution component so as to switch a water flow. The elastic reset member is provided in the hand shower body and acts on the transmission component to drive the transmission component to drive the toggle button to be reset. The limiting portion acts on the rotary disc to prevent a rotation of the rotary disc in a reverse direction. When using the hand shower according to the embodiment of the present disclosure, the user can hold the grip portion of the hand shower body with one hand, and touch the side surface of the hand shower body and toggle the toggle button with a finger to drive the transmission component to drive the rotary disc to rotate relative to the water distribution component, thereby completing a switching of a water dispensing mode (switching of the water flow state). Then, when the force of the finger acting on the toggle button is released, the toggle button is reset under the action of the elastic reset member so as to be ready for the next toggling. At the same time, while the toggle button is being reset, the limiting portion prevents a rotation of the rotary disc in a reverse direction so that the rotary disc is maintained in the current state, namely, the current water flow is maintained. Since the toggle button can be reset, the toggle button is always in an easily operable position. Therefore, the hand shower according to the embodiment of the present disclosure is more convenient in switching the water dispensing mode.

A shower device according to an embodiment of the present disclosure includes the hand shower with an automatically returnable side switch handle according to the embodiment of the present disclosure and therefore also has the advantage of convenient switching of the water dispensing mode.

The above description is merely illustrative of preferred embodiments of the present disclosure and is not intended to limit the present disclosure. It will be understood by those skilled in the art that various modifications and variations may be made to the present disclosure. Any modifications, equivalent alternatives, improvements and so on made within the spirit and principle of the present disclosure are intended to be encompassed within the scope of protection of the present disclosure.

INDUSTRIAL APPLICABILITY

A hand shower with an automatically returnable side switch handle according to an embodiment of the present disclosure has a toggle button that can be reset after being pulled, so that the toggle button is always in an easily operable position. Therefore, the hand shower according to the embodiment of the present disclosure is more convenient in switching the water dispensing mode. A shower device according to an embodiment of the present disclosure also has the characteristic of convenient operation when in use.

What is claimed is:

1. A hand shower with an automatically returnable side switch handle, comprising:

a hand shower body, in which a rotary disc and a water distribution component are provided, wherein a notch is formed in a side surface of the hand shower body;

a limiting portion, fixed in the hand shower body; and a switching mechanism, comprising a toggle button, a transmission component and an elastic reset member, wherein the toggle button is movably provided in the notch and is linked with the transmission component, and the transmission component is driven to move by toggling the toggle button;

the transmission component is linked with the rotary disc, so as to drive the rotary disc to rotate in a forward direction relative to the water distribution component, so as to switch a water flow; and the elastic reset member is provided in the hand shower body and acts on the transmission component, so as to drive the transmission component to drive the toggle button to be reset, wherein the limiting portion acts on the rotary disc, so as to prevent the rotary disc from rotating in a reverse direction, wherein the transmission component comprises a transmission member, a driving member, and a driving pawl, the transmission member comprises a connecting member and a toothed structure, wherein the toothed structure is provided at one end of the connecting member, and the other end of the connecting member is connected to the toggle button; the connecting member is rotatably provided on a rear cover via a fixed shaft, and the connecting member is configured to rotate around the fixed shaft, so as to drive the driving member to rotate; and the elastic reset member has one end fixed to the rear cover, and the other end connected to the connecting member, and wherein a boss is provided on a side surface of the connecting member, and one end of the elastic reset member is sleeved on the boss.

2. The hand shower with an automatically returnable side switch handle according to claim 1, wherein the water distribution component comprises a water distribution tray and the rear cover connected to each other, and a plurality of first water passage holes are provided in the water distribution tray;

the rotary disc comprises a switching plate and a rotating portion connected to each other, wherein the switching plate is located between the water distribution tray and the rear cover, second water passage holes are provided in the switching plate to match the first water passage holes, and the rotating portion passes through the rear cover and is connected to the transmission component; and the transmission component, the elastic reset member, and the limiting portion are provided on a surface of the rear cover.

3. The hand shower with an automatically returnable side switch handle according to claim 2, wherein the transmission member is linked with the toggle button, the driving member has driving teeth, and the driving teeth of the driving member mesh with the toothed structure of the transmission member; and the driving pawl is provided on a surface of the driving member and is configured to move along with the driving member; and the rotating portion comprises a rotating shaft and a driving ratchet, wherein the rotating shaft has one end connected to the switching plate; and the driving ratchet is provided at an end of the rotating shaft away from the switching plate and is in transmission connection to the driving pawl.

4. The hand shower with an automatically returnable side switch handle according to claim 3, wherein the driving ratchet and the rotating shaft are fixed by a snap ring.

5. The hand shower with an automatically returnable side switch handle according to claim 3, wherein a clamping groove is provided in a surface of the driving member, and the driving pawl is clamped in the clamping groove; and the driving pawl is meshed with the driving ratchet.

6. The hand shower with an automatically returnable side switch handle according to claim 5, wherein the surface of the driving member is provided with two clamping grooves spaced apart from each other, two driving pawls are clamped in the two clamping grooves, respectively, and the two driving pawls are both meshed with the driving ratchet.

7. The hand shower with an automatically returnable side switch handle according to claim 3, wherein the limiting portion comprises a limiting pawl, and the limiting pawl is fixed on a surface of the rear cover and abuts against the driving ratchet, so as to prevent the driving ratchet from rotating in a reverse direction.

8. The hand shower with an automatically returnable side switch handle according to claim 3, wherein a protruding shaft is provided on a surface of the rear cover, wherein the driving member is rotatably sleeved on the protruding shaft, one of the protruding shaft and the driving member is provided with a limiting block, the other one of the protruding shaft and the driving member is provided with a limiting groove, wherein the limiting block is configured to slide in the limiting groove.

9. The hand shower with an automatically returnable side switch handle according to claim 8, wherein the limiting block is provided on an outer side wall of the protruding shaft, and the limiting groove is provided in an inner side wall of the driving member to fit with the limiting block.

10. The hand shower with an automatically returnable side switch handle according to claim 1, wherein the hand shower body comprises a head portion and a grip portion connected to the head portion, wherein the notch is located in a side surface of the head portion of the hand shower body close to the grip portion.

11. The hand shower with an automatically returnable side switch handle according to claim 10, wherein the notch is in a shape of a strip and extends along a peripheral side of the head portion of the hand shower body, and the toggle button is configured to move in a length direction of the notch.

12. The hand shower with an automatically returnable side switch handle according to claim 10, wherein a water inlet pipe is provided in the grip portion of the hand shower body, and the water inlet pipe communicates with the water distribution component.

13. The hand shower with an automatically returnable side switch handle according to claim 1, wherein the toggle button is equipped with a shielding piece, wherein a gap is formed in the shielding piece, and the toggle button is embedded in the gap; and the shielding piece is configured to move along with the toggle button to shield the notch.

14. The hand shower with an automatically returnable side switch handle according to claim 1, wherein the elastic reset member is a spring.

15. The hand shower with an automatically returnable side switch handle according to claim 1, wherein the hand shower body is equipped with self-cleaning silicone dots and a water outlet panel, wherein the self-cleaning silicone dots are provided between the water outlet panel and the water distribution component.

16. The hand shower with an automatically returnable side switch handle according to claim 15, wherein the hand shower body is provided with a decorative cover to shield the water outlet panel.

17. The hand shower with an automatically returnable side switch handle according to claim 1, wherein the hand shower body is provided with a spray plug, and the spray plug communicates with the water distribution component.

18. A shower device, comprising the hand shower with an automatically returnable side switch handle according to claim 1.

* * * * *